April 23, 1968   F. H. SWAIM   3,379,840
VACUUM ACTIVATED, MAGNETIC DRIVE SWITCH
Filed Oct. 24, 1966

Frank H. Swaim
INVENTOR

BY

ATTORNEY

AGENT

3,379,840
VACUUM ACTIVATED, MAGNETIC DRIVE SWITCH

Frank H. Swaim, Silver Spring, Md., assignor to the United States of America as represented by the Secretary of the Navy
Filed Oct. 24, 1966, Ser. No. 589,140
6 Claims. (Cl. 200—81)

The invention described herein may be manufactured and used by or for the Government of the United States of America for governmental purposes without the payment of any royalties thereon or therefor.

This invention relates generally to a switching device and more particularly to a vacuum responsive magnetic drive switch.

Ballistic missiles in flight experience the phenomenon of near weightlessness at the apex of these trajectories. On a parabolic trajectory, for example, a ballistic missile enters the vacuum of outer space as the atmosphere of the earth diminishes. At the apex of the trajectory a period of weightlessness is experienced from the change over from missile acceleration to deceleration, or in other words, when the missile velocity and radius of curvature are such that the centrifugal force equals the gravitational force. The missile may, of course, take any random orientation during flight and will have a slight gravity loading resulting from its own spin or tumbling. In the past, zero gravity sensing devices have used the weightlessness phenomenon purposes in ballistics missiles to sense a zero g portion of the trajectory. Although satisfactory for the purposes utilized, zero gravity sensing devices have had difficulties in some ballistic missile applications because absolute zero gravity has not been obtainable and omnidirectional sensing characteristics are difficult to achieve. The present invention makes use of the deep vacuum environment of outer space which avoids the gravity and orientation problems encountered by zero gravity sensing devices. In doing so the invention provides a switch which is directly responsive to a deep vacuum, requires a minimum of movable parts, and which is reliable regardless of its orientation.

An object therefore, is to provide a new and improved omnidirectional switch.

Another object is the provision of a new and improved vacuum activated switch.

Still another object is to provide a novel omnidirectional switch for a ballistic missile which is responsive to actuate in a deep vacuum environment.

These and other objects are attained in accordance with the invention by providing a magnetic drive switch with two concentric spherical shells wherein the outside shell is composed of an expansible material which allows the switch to open or close contacts or valves when subjected to a vacuum.

Other objects, features and attendant advantages of this invention will be readily appreciated as the same becomes better understood by reference to the accompanying drawings wherein:

FIG. 1b illustrates a top cross-sectional view of the embodiment of FIG. 1a;

Figure 1A:
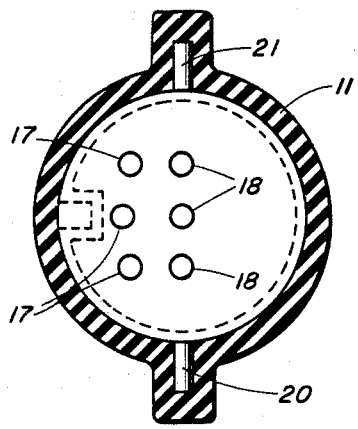
FIG. 1a illustrates a cross-sectional side view of one embodiment of the invention in a normal environment.
Figure 1B:
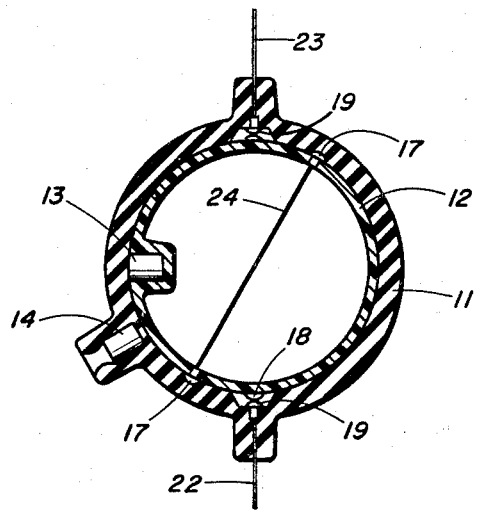

Referring now to the drawings, FIG. 1 shows an embodiment of the invention wherein a magnetic drive switching arrangement closes electrical contacts when subjected to a deep vacuum such as that experienced in outer space. Pivots 20 and 21 support two concentric spherical shells which are movable with respect to each other. The outer shell 11 which may be rubber or other similar expansible material is normally in the position shown in FIGS. 1a and 1b with respect to the inner shell 12. The inner shell 12 is a hollow plastic ball with perforations and two pairs of rows of metallic contacts 17 and 18 running around the plastic ball. A magnet 13 is located at the equator of the plastic sphere 12 and an oppositely poled magnet 14 is located at the equator of the rubber sphere 11 at a predetermined angular displacement from the inner sphere.

Plastic sphere 12 has the first row of internal contacts 18 running around the sphere between studs located at pivots 20 and 21. Contacts 18 are normally engaged on contacts 19 connected to electrical leads 22 and 23. Second rows of contacts 17 are also attached to the inner sphere 12, only displaced around the sphere at the same angular displacement that magnet 13 is separated from magnet 14.

Figure 2:
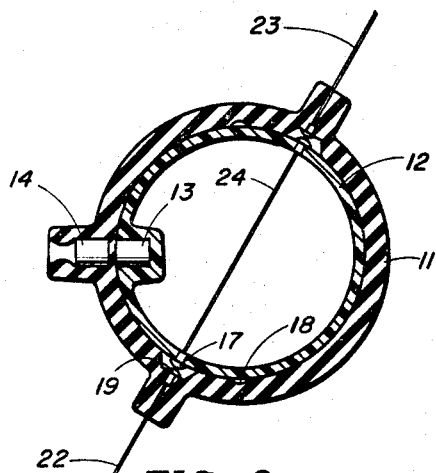
FIG. 2 illustrates a top cross-sectional view of the embodiment of FIG. 1 in a vacuum environment.

The switching device of the embodiment of FIG. 1 is in a steady state under normal atmospheric pressure with rows of contacts 18 engaged with contacts 19. The elastic pressure of the hollow rubber sphere 11 maintains continuity of the bottom contacts and creates a pressure sufficient to prevent magnet 13 from aligning with magnet 14. Upon exposure to a deep vacuum, magnets 13 and 14 align with each other as shown in FIG. 2 and contacts 17 are then closed on electrical leads 22 and 23. When leads 22 and 23 are connected to an electrical source, current from a source (not shown) can pass through interconnecting lead 24 to provide an information or control signal where desired. When the vacuum is removed the rubber sphere 11 will return to its configuration shown in FIG. 1 and contacts 17 and 19 will break opening the circuit once again.

Figure 3:
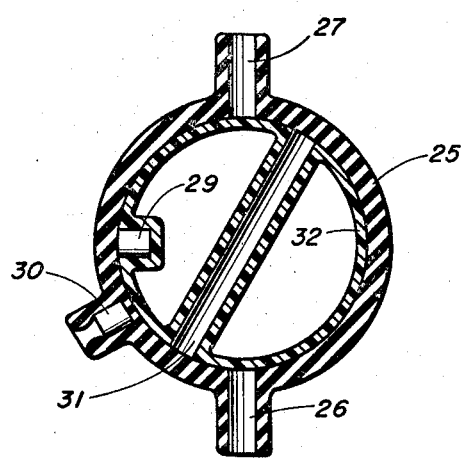
FIG. 3 illustrates a top cross-sectional view of another embodiment of the invention.

FIG. 3 illustrates another embodiment of the invention wherein a deep vacuum environment activates a magnetic drive switching arrangement to open fluid valves. Inlet channel 26 is in the rubber ball 25 separated from outlet channel 27 in the rubber ball under normal atmospheric conditions. When subjected to a vacuum, however, magnets 29 and 30 align as described with regard to FIGS. 1 and 2 permitting fluid passage 31 passing through the plastic ball 32 to connect the inlet and outlet channels for fluid flow therethrough.

Since vacuum is a progressive state, a missile moving upward on its trajectory encounters greater and greater vacuum. This condition provides for sequential operation of a multiple of switches such as that described. The switch is designed to allow for evacuation of air from within so that each switch can be preset to function at a particular vacuum range. For example, one switch may be evacuated so as to operate at $10^{-1}$ cc. of mercury while another switch, with greater evacuation, may be regulated to operate at $10^{-4}$ cc. of mercury.

The design of the switch is also such that if leakage should occur the switch will "fail safe." With leakage present the internal pressure will equalize with the external pressure but built-in circumferential pressure of the outer hollow ball will prevent rotation by the internal ball.

This switch has many applications in satellite technology as well as missiles. It can perform a switching function by grounding while in the earth's atmosphere and open a circuit and remain open while in a vacuum environment.

From the foregoing it is apparent that a new and improved omnidirectional switch has been disclosed which is directly responsive to a vacuum to open or close electrical contacts or fluid valves. It should be understood, of course, that the foregoing disclosure relates to only specific embodiments of the invention and that numerous modifications or alternations may be made therein without departing from the spirit and scope of the invention as set forth in the appended claims.

What is claimed is:

1. An omnidirectional, vacuum activated switch having a closed position in atmospheric pressure environments and an open position in a vacuum comprising, an external hollow spherical member composed of an elastomeric material and having input and output signal switching elements connected thereto;

an internal hollow spherical member composed of a non-elastomeric material concentric with and movably contained within said external spherical member, having at least one interconnecting switching means; and switch actuating means connected to said spherical members for moving said interconnecting switch element between said input and output signal elements in response to the expansion of said external spherical member when subjected to a vacuum.

2. The device of claim 1 wherein said actuating means includes first and second oppositely poled magnets, said first magnet being contained within said external spherical member and said second magnet disposed within said internal spherical member at a predetermined angular displacement from said first magnet, whereby said magnets align when said external member expands in a vacuum and close a signal path through said switch.

3. The device of claim 1 wherein said switch is an omnidirectional electrical switch, said switching means includes at least one electrical lead and a pair of electrical contacts, and said input and output signal means include input and output electrical contacts.

4. The device of claim 1 where said switch is an omnidirectional fluid switch, said input and output signals means include input and output fluid channels interconnected by at least one fluid channel.

5. The device of claim 3 wherein said actuating means includes first and second oppositely poled magnets, said first magnet being contained within said external spherical member and said second magnet disposed within said internal spherical member at a predetermined angular displacement from said first magnet, whereby said magnets align when said external member expands in a vacuum and close an electrical signal path through said switch.

6. The device of claim 4 wherein said actuating means includes first and second oppositely poled magnets, said first magnet being contained within said external spherical member and said second magnet disposed within said internal spherical member at a predetermined angular displacement from said first magnet, whereby said magnets align when said external member expands in a vacuum and close a fluid signal path through said switch.

References Cited
UNITED STATES PATENTS

| | | | |
|---|---|---|---|
| 3,027,435 | 3/1962 | Shlesinger | 200—81 |
| 3,206,160 | 9/1965 | Bennett | 251—65 |

BERNARD A. GILHEANY, *Primary Examiner.*

H. BROOME, *Assistant Examiner.*